Aug. 22, 1967 F. A. BARTON ET AL 3,337,791
FREQUENCY MULTIPLIER
Filed Aug. 20, 1964

INVENTORS:-
FREDERICK A. BARTON &
CHARLES B. LEUTHAUSER
BY J. L. Whittaker
Attorney United States Patent Office 3,337,791

Patented Aug. 22, 1967

3,337,791

FREQUENCY MULTIPLIER

Frederick A. Barton and Charles B. Leuthauser, Canonsburg, Pa., assignors to Radio Corporation of America, a corporation of Delaware Filed Aug. 20, 1964, Ser. No. 390,814
8 Claims. (Cl. 321—69)

ABSTRACT OF THE DISCLOSURE

A frequency multiplier is provided which includes a two-terminal non-linear element, for example, a varactor diode. Signal energy at a fundamental frequency, which it is desired to multiply, is supplied to the non-linear element through a tuned circuit. A helical resonator, which comprises a line disposed within a cavity, is tuned to resonate at a harmonic of the fundamental frequency in a manner to allow current to flow through the non-linear element at that harmonic. This harmonic frequency component can be used as a direct output or as an idler to enhance multiplication at further frequencies. The output may be further filtered by coupling to a load through a bandpass filter also constructed of helical line resonators.

This invention relates to frequency multipliers and particularly to improved frequency multipliers utilizing non-linear circuit elements.

Frequency multipliers are electronic devices which take advantage of low frequency power generation techniques to produce higher power signals at relatively high frequencies. The frequency of a high power, low frequency signal is multiplied by the frequency multiplier to obtain the desired high frequency signal at a suitable power level. Generally, frequency multipliers employ a non-linear circuit element, such as a variable capacitance diode, as a means for generating harmonics of a low frequency high power signal which is supplied to the non-linear element. Resonant circuits are employed both to enhance the desired harmonic generation and to remove energy from the non-linear element at the desired frequencies. Depending upon the particular frequencies of operation, the resonant circuits have in the past taken the form of either waveguide structures at relatively high frequencies, e.g. above about 500 mc. (megacycles) or conventional lumped-element filter circuitry below 500 mc. The use of lumped-element circuitry is accompanied by certain disadvantages when it is used in the frequency range of about 50 mc.–500 mc. Within this range, it is difficult to construct an efficient frequency multiplier employing simple lumped-element circuits. When low levels of spurious frequency are required in the output, it is necessary to employ a great deal of filtering if lumped-element circuits are used. This heavy filtering results in high losses and a correspondingly low conversion efficiency; conversion efficiency being defined as the percentage of low frequency input power converted to useful high frequency output power. Furthermore, construction of lumped-element circuits is difficult in the 50–500 mc. frequency range and unless special precautions are taken, unambiguous tuning is difficult.

It is therefore an object of the present invention to provide an improved frequency multiplier which operates at a high conversion efficiency.

It is a further object of the present invention to provide an improved frequency multiplier which offers good filtering and simple construction.

A further object of the present invention is to provide an economical high efficiency frequency multiplier which operates in the 50–500 megacycle region and requires little space.

The above objects are accomplished by utilizing the advantages of helical resonator construction in the multiplier. In a frequency tripler constructed according to the present invention, a non-linear circuit element, preferably a variable capacitance diode, is used as a harmonic generator. Energy at a fundamental frequency, which it is desired to multiply, is supplied to the non-linear element through a suitable tuned circuit. A first helical resonator, which comprises a line disposed within a cavity, is tuned to resonate at twice the fundamental and is connected to the non-linear element to allow second harmonic current to flow through the non-linear element. The first helical resonator thus serves as a second harmonic idler. Third harmonic current is selectively fed to a load through a suitable bandpass filter which is also constructed according to helical resonator techniques. The bandpass filter may, for example, take the form of two helical resonators which are capacitively coupled.

The resulting frequency multiplier is simple in construction and provides a high conversion efficiency. The cavities of the three helical resonators in the frequency tripler described above may be formed, for example, as part of an integral die casting resulting in a low cost construction. Once the cavities are produced, great flexibility as to the frequencies which can be multiplied is available by changing the lengths of the helical lines disposed within the cavities. The helical resonators also provide excellent filtering with low loss.

A more detailed description of the invention will now be given with reference to the accompanying drawing in which.

Figure 1:
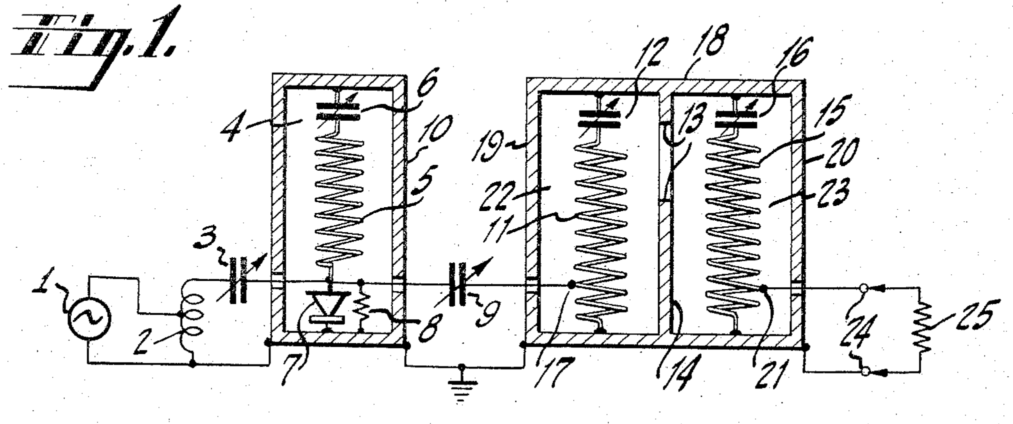
FIG. 1 is a circuit diagram of a frequency tripler constructed according to the present invention.

FIGURE 1 is a circuit diagram of a frequency tripler embodying the present invention. An input source of electrical energy 1 of a frequency which it is desired to multiply is connected through a conventional matching network which includes an inductor 2 and a variable capacitor 3 to a non-linear circuit element, here a variable capacitance diode 7. The variable capacitance diode 7 is located within the cavity 4 of a first helical resonator 10 which is constructed to resonate at twice the frequency of the input source 1. The first helical resonator 10 is constructed according to known techniques. For example, for a discussion of proper helical resonator design, see Reference Data for Radio Engineers, fourth edition, International Telephone and Telegraph Corporation, Stratford Press 1956, pages 600–603. The resonator 10 includes a one quarter wavelength helical line 5 connected at one end through the variable capacitance diode 7 to one end wall of the cavity 4. A trimmer capacitor 6 completes a capacitive connection of the other end of the line 5 to the other end wall of the cavity 4. A resistor 8 is connected across the variable capacitance diode 7 to provide a proper self-bias.

The variable capacitance diode 7 is coupled through a variable capacitor 9 to a bandpass filter 18. The bandpass filter 18 comprises two helical resonators 19 and 20 capacitively coupled through a window 13. The first helical resonator 19 of the filter comprises a first helical line 11 which is connected at one end to one end wall of the cavity 22 and at the other end through a trimmer capacitor 12 to the other end wall of the cavity 22. The length of the line 11 is such that it can be trimmed to resonate at three times the frequency of the input source 1 by the trimmer capacitor 12. The second helical resonator 20 of the filter is identical in construction to the first. It comprises a helical line 15, which is trimmed to resonate at three times the frequency of the input source by the trimmer capacitor 16, disposed in a cavity 23. The output is obtained from a tap position 21 on the line 15 and is supplied to the output terminals 24 and to a load 25. The window 13 between the two cavities provides capacitive coupling between the two filter resonators 19 and 20. For optimum spurious frequency rejection the window 13 should be displaced from the tap positions 17 and 21 as shown to prevent unwanted coupling directly between these two points.

The operation of the frequency tripler in FIGURE 1 is as follows. An input signal which is to be increased in frequency is supplied from a source 1. The matching circuit, comprising the inductor 2 and a capacitor 3, is tuned to resonance with the variable capacitance diode 7 at a center frequency and bandwidth corresponding to that of the input signal. The first helical resonator, comprising the cavity 4 and the helical line 5, is tuned to offer a very low impedance to the second harmonic of the input signal and therefore acts as an idler resonator at the second harmonic frequency to enhance the flow of second harmonic current through the variable capacitance diode 7.

The function of this idler resonator is to increase the generation of third harmonic current. The second harmonic current which is present because of the idler resonator mixes in the variable capacitance diode 7 with the first harmonic current supplied from the input source 1. The mixing action results in a greater component of third harmonic frequency than would be obtainable without the use of the idler resonator. The particular frequency characteristics of the idler resonator are selected according to the bandwidth requirements of the system which are determined in part by the center frequency and bandwidth of the input signal. The specific construction details of the helical resonator which forms the idler may be found in a suitable reference, for example the one cited above.

The resistor 8, which is connected across the variable capacitance diode 7, provides a suitable self bias for the diode 7 by providing a current path for the direct component of current produced by the non-linear element 7.

The third harmonic component generated by the mixing of the first harmonic component supplied by the input source 1 and the second harmonic component flowing through the idler resonator is supplied to the output terminals 24 and a load 25 through a bandpass filter 18. The bandpass filter 18 is matched to the variable capacitance diode 7 at the third harmonic of the input signal by selecting the tap position 17 on the first helical line 11 of the bandpass filter 18 so that a certain amount of inductance is presented to the coupling network. A proper third harmonic match is obtained by adjustment of the variable coupling capacitor 9. Capacitor 9 provides optimum impedance matching at the required output frequency between the variable capacitance diode 7 and the bandpass filter tap 17 for a wide range of impedances of the variable capacitance diode 7.

The characteristics of the bandpass filter 18 are selected according to the system requirements. Each of the two resonators of the bandpass filter 18 is identical in construction to the other and each may be designed according to known helical resonator techniques. The two cavities 22 and 23 may both be dimensionally the same as the first cavity 4. Capacitive coupling between the two resonators of the bandpass filter 18 is accomplished by the window 13 between the two cavities 22 and 23. The size and placement of the window 13 is selected according to the particular frequency requirements of the system. Generally where a broadband characteristic is desired, the window 13 should be displaced from the tap positions 17 and 21 in order to prevent appreciable coupling directly between the input and output terminals 17 and 22 of the bandpass filter 18.

Figure 2:
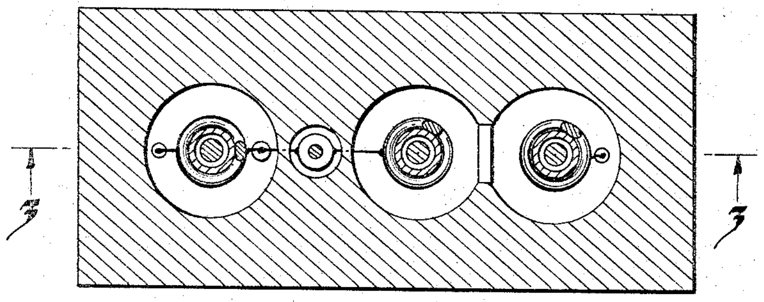
FIGS. 2, 3 and 4 are respectively a plan, a front and an elevation view in section illustrating certain construction details of the frequency multiplier of FIGURE 1.
Figures 3, 4:
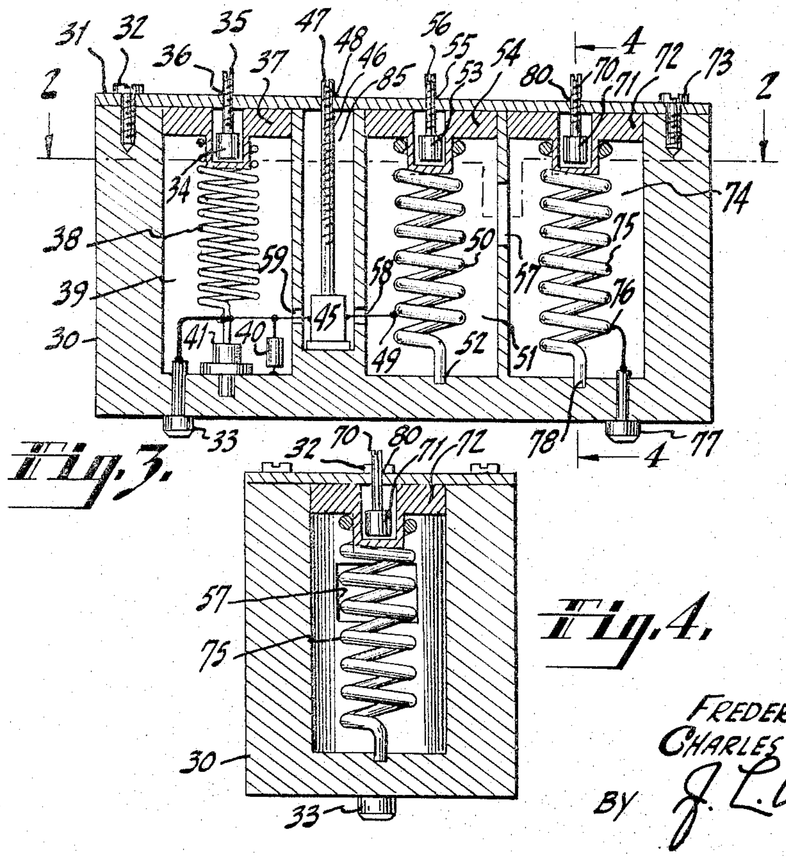

FIGURES 2, 3 and 4 are sectional views illustrating certain construction details of the frequency multiplier described above. Three resonant cavities 39, 51 and 74 are contained within a housing 30 of suitable conducting material, e.g. aluminum. Three helical lines 38, 50 and 75 are disposed in respective ones of the three resonant cavities 39, 51 and 74. The first helical line 38, disposed in the first cavity 39, forms the idler resonator and is tuned to resonate at twice the frequency of the input signal. The input signal is supplied through a suitable connector 33, which is mounted through a hole in the housing structure 30, to one end of the helical line 38 which one end is connected to the non-linear element, preferably a variable capacitance diode 41, suitably mounted in the cavity 39. The mounting end of the variable capacitance diode 41 forms the second electrical end of the diode and is therefore in electrical contact with the conducting material of the cavity 39. A biasing resistor 40 is connected at one end to the wall of the cavity 39 and at the other end to the variable capacitance diode 41. The upper end of the helical line 38 is supported by a supporting structure 37 which is constructed of dielectric material. A hollow center portion of the supporting structure 37 contains a cylindrical member of conducting material 34 which completes a trimmer capacitor for the helical line 38. The trimmer capacitor is formed by the dielectric material of the support 37 spaced between the conducting cylindrical member 34 and the helical line 38. Adjustment of the position of the cylindrical member 34 is obtained by turning a threaded shaft 35 disposed in a threaded hole 36 in a cover plate 31 of suitable conducting material. The cover plate 31 is rigidly secured to the main body portion 30 by set screws 32 and 73. A connection is made from the upper end of the variable capacitance diode 41 to a variable coupling capacitor 45 through a hole 59. The variable capacitor 45 is mounted within a cylindrical bore 85 and is adjustable through a turning action of the threaded shaft 46 which is mounted in a threaded hole 48 in the cover plate 31. A connection is made between the variable capacitor 45 and a second helical line 50 through a hole 58. The second helical line 50, disposed within the second cavity 51, is trimmed to resonate at three times the frequency of the input signal by adjustment of the position of the cylindrical member 53. The cylindrical member 53 is disposed in a hollow portion of the non-conducting supporting member 54. The member 53 and the supporting member 54 are identical in construction respectively to the member 34 and the supporting member 37 in the first cavity 39. The helical line 50 is supported at the bottom of the cavity 51 in a suitable manner at 52. A third helical line 75 is disposed within the third cavity 74 and is identical in construction to the helical line 50 disposed within the cavity 51. The upper supporting structure 72 and capacitive trimmer element 71 are identical in construction to those of the first and second cavities. Capacitive coupling between the two helical resonators 50 and 75 is provided through the use of a window 57 placed at the upper portion of the two cavities 51 and 74 to couple the second and third resonators to form a bandpass filter. The particular size and placement of the window 57 between the two resonators is selected according to the characteristics desired. A suitable output connector 77 is electrically connected to both the conducting body 30 and the helical line 75, the latter connection being made at a suitable tap position 76 along the line 75.

The operation of the frequency tripler shown in FIGURES 2, 3, 4 is essentially the same as that shown in FIGURE 1. The input and output matching networks shown in FIGURE 1 are not shown in FIGURES 2, 3 and 4. The construction of the frequency tripler is relatively simple as the main body portion 30 may be integrally manufactured by suitable die casting techniques. All three cavities may be the same size, the particular resonant frequencies being determined by the length of the helical line disposed within the cavity. Furthermore, the cavity size may remain the same for different frequency multiplications. Thus, the same basic structure 30 might be used to convert a 50 mc. signal to a 150 mc. signal or, with an appropriate change in helical lines, to convert a 150 mc. signal to a 450 mc. signal.

Tuning of the frequency tripler is accomplished first by trimming the lengths of the three helical lines 38, 50 and 75 by adjusting the positions of the respective cylindrical members 34, 53 and 71. The variable capacitor 45 is then adjusted to provide a matched circuit between the variable capacitance diode 41 and the bandpass filter comprising the two helical lines 50 and 75. A load (not shown) may be connected to the output connector 77. The present construction employs an air dielectric between the helical lines 39, 50 and 75, and the respective cavity walls. Other dielectrics may be used to alter the distributed capacitance between the particular line and cavity wall. Such other dielectric may take the form of an annular sleeve of suitable material positioned between the helical line and the cavity wall.

Figure 5:
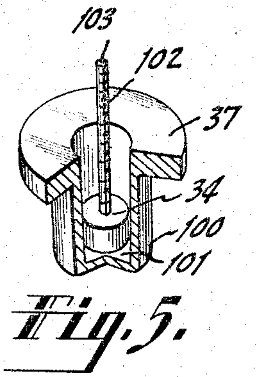
FIG. 5 is a partially sectioned isometric view of a supporting member used in the helical resonator construction.

The upper supporting structure for the helical line, which also serves as a trimmer capacitor, is shown in more detail in FIGURE 5. FIGURE 5 is a partially sectioned isometric view of the supporting and trimming structures. The reference numerals which were used in describing the supporting structure of the first cavity 39 of the tripler shown in FIGURES 2, 3 and 4 are also used in FIGURE 5. A first non-conducting upper cylindrical section 37 is adapted to be pressed snugly into a cavity such as the cavity 39 described with reference to FIGURES 2–3 above, while a lower cylindrical portion 100 is adapted to rigidly support a helical line such as 38 which fits snugly over it. An inner bore 101 is formed within both cylindrical sections 37 and 100 and houses a conducting cylinder 34 which forms a capacitor with that portion of the helical line (not shown) which surrounds the lower cylindrical proportion 100. A threaded shaft 102 is connected to the cylindrical member 34 and is used to adjust its longitudinal position within the bore 101 to thereby vary the capacitance. The threaded shaft 102 engages a threaded hole in the cover plate placed over the cavity. Adjustment is accomplished through the use of the slot 103 at the top of the threaded shaft 102. In addition to both supporting a helical line and providing a trimmer capacitor for the helical line, the material of the supporting member 37 may be so chosen as to prevent arcing between the end of the helical line and the conducting cylindrical element 34.

What is claimed is:

1. A frequency multiplier comprising:
(a) a non-linear circuit element,
(b) means for coupling an input signal at a first frequency to said non-linear element,
(c) a first helical resonator tuned to resonate at twice the frequency of said input signal,
(d) means for connecting said first helical resonator in a closed circuit loop which includes said non-linear circuit element,
(e) second and third helical resonators,
(f) means for coupling said second and third helical resonators to form a bandpass filter, and
(g) means for coupling said bandpass filter to said non-linear circuit element to pass a selected band of frequencies generated by said non-linear circuit element to a load connected to said bandpass filter.

2. A harmonic generator as claimed in claim 1 wherein said non-linear circuit element is a voltage variable capacitance diode.

3. A frequency multiplier comprising:
(a) a cavity having conducting walls,
(b) a two terminal non-linear circuit element disposed in said cavity,
(c) means for connecting one end of said non-linear element to the conducting walls of said cavity,
(d) a helical conducting element,
(e) means for connecting one end of said helical conducting element to the other end of said non-linear element, said helical conducting element forming a resonant structure with said cavity,
(f) means for coupling electrical energy of a first frequency to said non-linear circuit element,
(g) means for removing energy at a selected harmonic frequency from said non-linear circuit element, and
(h) means for supplying said removed energy to a load.

4. A frequency multiplier as claimed in claim 3 wherein said non-linear circuit element is a voltage variable reactance diode.

5. A frequency multiplier comprising:
(a) first, second, and third cavities each having conducting walls and each being approximately the same size and configuration,
(b) a non-linear two-terminal circuit element disposed in said first cavity,
(c) means for connecting a first terminal of said non-linear circuit element to said conducting walls of said first cavity,
(d) a first helical conducting line disposed in said first cavity,
(e) means for electrically connecting said helical line at one end to the second terminal of said non-linear circuit element and at the other end through a trimmer capacitor to the conducting walls of said first cavity whereby said helical line resonates at a first frequency with said first cavity,
(f) means for coupling electrical energy of a first frequency to said non-linear circuit element,
(g) second and third helical conducting lines disposed respectively in said second and third cavities, each line being constructed to resonate with its respective cavity at a frequency equal to one and one-half times said first frequency,
(h) means for capacitively coupling said second and third helical lines to form a bandpass filter, and
(i) means for removing electrical energy from said non-linear circuit element and supplying said energy through said bandpass filter to an output circuit.

6. A frequency multiplier as claimed in claim 5 wherein said non-linear circuit element is a variable capacitance diode.

7. A frequency multiplier as claimed in claim 6 wherein said means for coupling a source of electrical energy to said non-linear circuit element comprises a circuit for matching the impedance of a source to the impedance across said non-linear element.

8. A frequency multiplier as claimed in claim 6 wherein said means for removing electrical energy from said non-linear circuit element and supplying said energy through said bandpass filter to a load comprising:

(a) capacitive coupling between said non-linear element and said second helical line, and (b) an electrical connection between said third helical line and the load.

References Cited

UNITED STATES PATENTS

| | | | |
|---|---|---|---|
| 2,408,420 | 10/1946 | Ginzton | 321—60 |
| 2,753,530 | 7/1956 | Horvath | 334—42 X |
| 3,060,365 | 10/1962 | Crandell | 321—69 |
| 3,090,920 | 5/1963 | Levine | 334—41 X |
| 3,159,803 | 12/1964 | Czubiak et al. | 338—82 X |
| 3,175,164 | 3/1965 | Schreiner | 330—4.9 |
| 3,223,918 | 12/1965 | Ludwig et al. | 321—69 |

JOHN F. COUCH, *Primary Examiner.*

G. GOLDBERG, *Assistant Examiner.*